May 24, 1960 L. E. ALLEN ET AL 2,937,647
GRAIN SEPARATING MECHANISM FOR COMBINE
Filed June 9, 1958 2 Sheets-Sheet 1
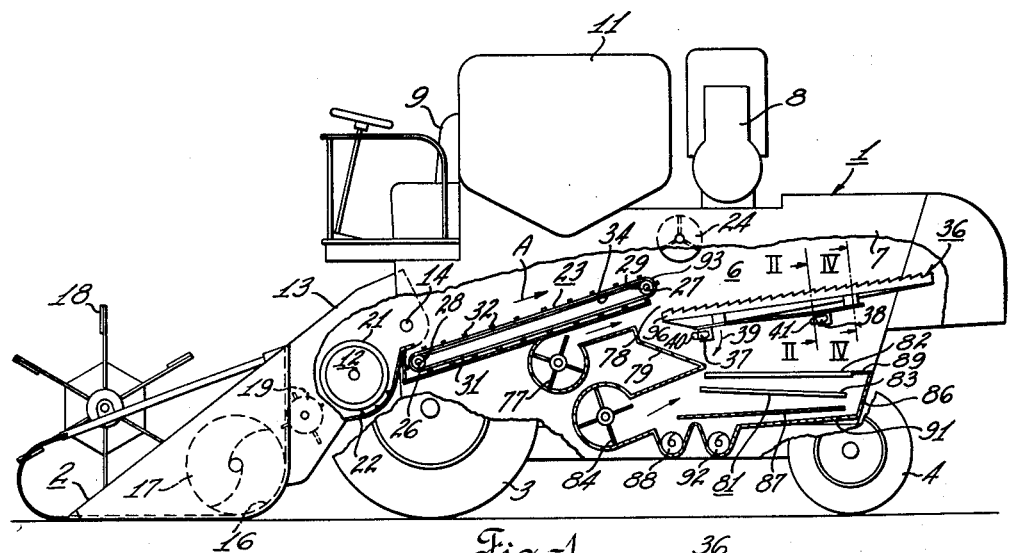

May 24, 1960   L. E. ALLEN ET AL   2,937,647
GRAIN SEPARATING MECHANISM FOR COMBINE
Filed June 9, 1958   2 Sheets-Sheet 2
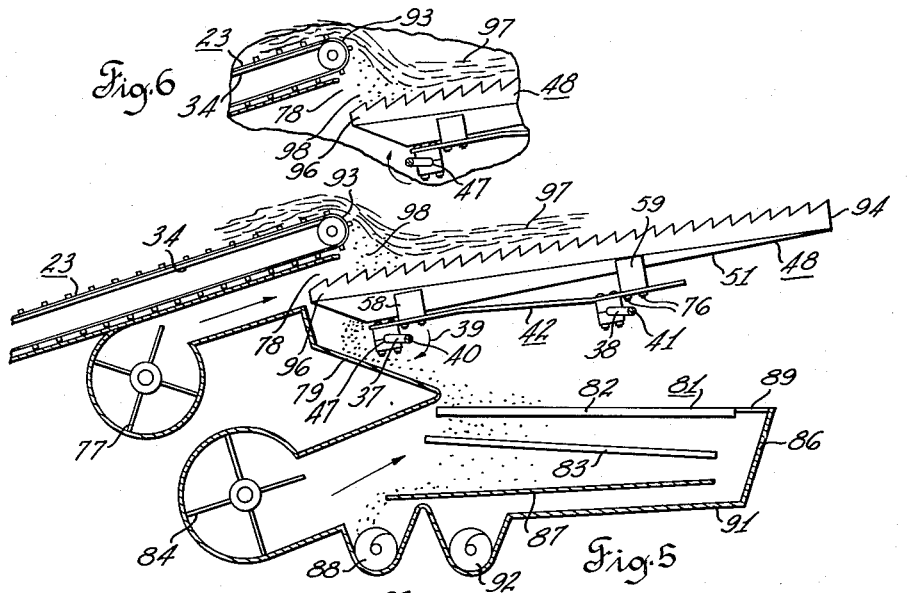
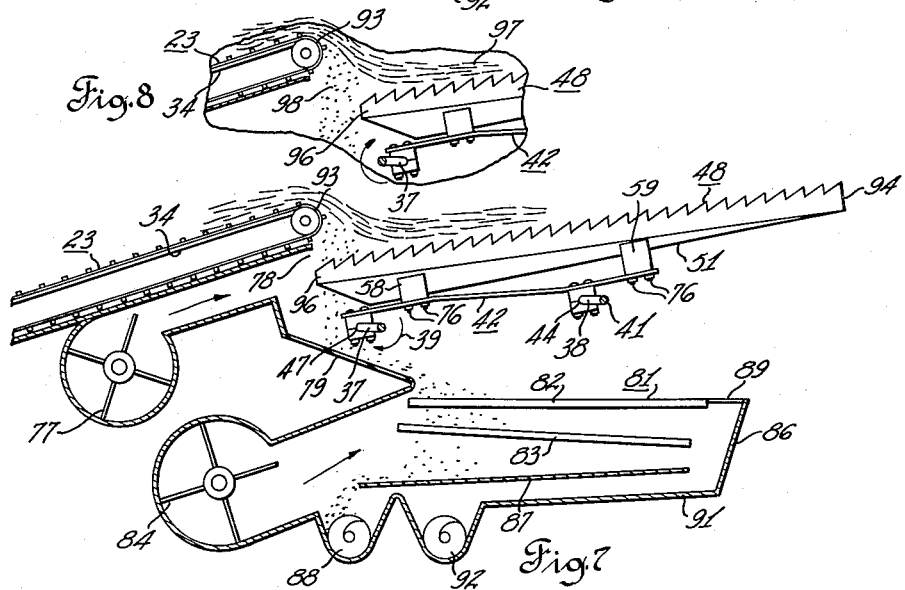
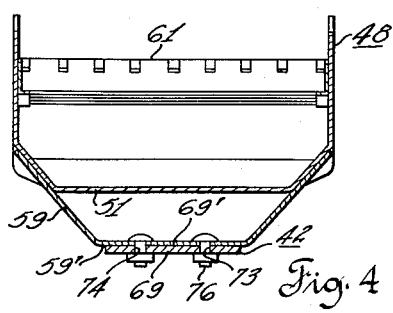
Inventors
Lawrence E. Allen
Ellis Wertz
By Ronald C. McLaughey
Attorney

United States Patent Office

2,937,647
Patented May 24, 1960

2,937,647

GRAIN SEPARATING MECHANISM FOR COMBINE

Lawrence E. Allen, Independence, Mo., and Ellis Wertz, Madison, Wis., assignors to Allis-Chalmers Manufacturing Company, Milwaukee, Wis.

Filed June 9, 1958, Ser. No. 740,833

5 Claims. (Cl. 130—26)

This invention relates to separating mechanisms and it is concerned more particularly with an improved cleaning and separating mechanism for use in a combine type harvester.

In the operation of certain types of combines as heretofore constructed the harvested crop is passed through a threshing mechanism and then onto a raddle or other type conveying structure. The raddle carries the threshed material rearwardly and discharges this material upon a second separating structure such as a group of straw walkers located slightly below the raddle. The walkers are mounted so that a vertical gap exists between the discharge end of the raddle and the adjacent tops of the walkers.

In combine constructions as hereinabove described all of the threshed material passes directly onto the walkers. The walkers are driven with an oscillating movement which agitates and moves the mat of threshed material rearward causing the grain and chaff to sift through the straw and fall through suitable openings provided in the walker. This oscillation is at a high rate and during downward movement of the walker a space exists between the top of the walker and the mat of threshed material. In machines of the mentioned type provisions are also sometimes made to direct a flow of air through the space between the discharge end of the raddle and the adjacent end of the walker. This flow of air passes between the bottom of the walker and the mat of material and precleans by floating or keeping the chaff above the walker sections while allowing the heavier grain to fall through the openings in the walker. Some chaff of course also falls through the openings and this chaff passes to the finish cleaning shoe along with the grain for passage over finish cleaning sieves where a second flow of air lifts the chaff and blows it out on the ground while the heavier grain falls through the sieve openings and is conveyed to a suitable storage receptacle.

This arrangement has not proven entirely satisfactory to effect proper recovery of grain from the rest of the threshed material under conditions where the threshed material contains, in addition to straw, loose kernels and unthreshed heads, a substantial amount of fine or shredded matter in the form of chaff, leaves and beards. This fine or shredded material forms a heavy mat over the walkers and hinders or prevents the grain in the straw from working down and passing through the openings in the walkers. It is obvious that in circumstances where the grain cannot be separated from the straw and chaff it will be lost. Not only are these losses highly undesirable but in an attempt to reduce them the operator of the machine will invariably reduce ground speed travel and greatly increase harvest time.

In an effort to alleviate this problem rotary beaters and oscillating rake structures have been suggested to agitate the mat of material as it passes from the raddle to the straw walker. These expedients have proven ineffective under conditions encountered, as for instance, when harvesting barley or down crops where the objectionable mat of fine material is formed on the straw walkers. The agitating action of the beater and rake structures leaves the volume of threshed material unaffected and consequently plugging of the walkers is not avoided. In addition, the mentioned air flow is relatively ineffective to produce separating action upon the threshed material passing from the raddle to the walkers when all of the threshed material is delivered directly to the walkers. In essence, heretofore known constructions have been inadequate to take care of the mentioned fine material with a resultant condition in which the walkers are overloaded while the cleaning shoe is not receiving enough material to work at capacity.

While the presence of the mentioned fine material presents a specialized problem any modifications in separator design to overcome said problem must not reduce the efficiency of separation nor render the combine ineffective under conditions where it previously operated without difficulty.

Generally it is an object of this invention to provide a separating mechanism which overcomes the shortcomings outlined hereinbefore in a simple and fully satisfactory manner. It is a further object of this invention to provide a grain separator for a combine type harvester which is capable of efficiently separating and cleaning threshed grain in threshed crops where an excessive amount of fine material is encountered.

It is a further object of this invention to provide a separating mechanism in which the amount of separated threshed material delivered to the straw walkers can be controlled to alleviate an overload condition of the straw walkers.

A further object of this invention is to provide a separating mechanism in which an air flow is directed to a mat of threshed material in an improved manner to provide more efficient separation.

These and other objects and advantages are obtained by the present invention, various novel features of which will become apparent from the following description and claims.

Referring to the drawings:

Fig. 1 is a side view of a combine with parts broken away and shown in section for purposes of disclosure;

Fig. 2 is an enlarged partial sectional view taken along line II—II of Fig. 1 showing a unit of three straw walkers;

Fig. 3 is a perspective bottom view of one of the straw walkers shown in Fig. 2;

Fig. 4 is an enlarged sectional view taken along line IV—IV of Fig. 1 and showing only one of the straw walker sections;

Fig. 5 is a diagrammatic view of the separating mechanism showing the straw walker in a first position of adjustment and at a forward limit of travel in its operating cycle;

Fig. 6 is a partial diagrammatic view showing the straw walker in the same position of adjustment as that of Fig. 5 but at a rearward limit of travel in its operating cycle;

Fig. 7 is a diagrammatic view of the separating mechanism showing the straw walker in a second position of adjustment and at a forward limit of travel in its operating cycle; and Fig. 8 is a partial diagrammatic view showing the straw walker in the same position of adjustment as that of Fig. 7 but at a rearward limit of travel in its operating cycle.

The combine shown in Fig. 1 includes a mobile longitudinal body structure generally indicated by the reference character 1 and a laterally extending header structure generally indicated by the reference character 2.

The arrangement of the combine body structure 1 is of generally conventional construtcion in that it comprises a pair of laterally spaced front driving wheels 3, a pair of laterally spaced steerable rear wheels 4, a separating mechanism 6 enclosed within the housing 7 and an engine 8 for supplying power to the driving wheels 3 and to the other driven parts of the combine. The body structure 1 further includes an operator's station 9, a grain bin 11 and a threshing mechanism 12 enclosed within a housing or throat portion 13. The throat portion 13 is pivotally mounted at 14 on the forward end of the body structure 1 for up and down adjustment to different elevated positions above the ground affording the operator selection of desired cutting height of the header structure 2. It will be understood that up and down adjustment of the housing 13 about the pivotal mounting 14 is accomplished in conventional manner by suitable hydraulic rams (not shown) along with conventional control mechanism (not shown) therefor mounted at the operator's station 9.

The header structure 2 is also conventional in construction and includes a cutting mechanism (not shown) of the reciprocating sickle bar type which extends across the full width of the header and a header housing or trough generally indicated by the reference character 16. The header structure further includes a conventional transverse auger 17 rotatably mounted within the trough 16 and a conventional reel mechanism 18. The entire header structure 2 including cutting mechanism auger and reel is rigidly secured to the forward part of the thresher housing or throat 13 in conventional manner.

As shown in Fig. 1 and in accordance with generally accepted practice corps cut by the reciprocating cutting mechanism are conveyed to the center of the header trough 16 by means of the auger 17. At the center or midportion of the auger 17 the cut material is engaged by a conventional retractable finger mechanism (not shown) which aids in passing the crop rearwardly into the narrow throat portion 13. In the narrow throat portion 13 the cut crop is engaged by another retractable finger feeding mechanism 19 which aids in delivery of the crop to the threshing mechanism 12. It will be understood that the harvested material is fed between a threshing cylinder 21 and an associated concave 22 for threshing in a conventional manner.

After the cut crop has passed through the threshing cylinder it is discharged to the separating mechanism 6. The separting mechanism 6 includes a conveying structure or mechanism 23 of the raddle type. The raddle conveyer includes front and rear shafts 26 and 27 which are rotatably mounted to extend transversely of the separator housing 7. In accordance with conventional practice the shaft 26 mounts a pair of axially spaced sprockets 28 and shaft 27 mounts a similar pair of sprockets 29. Link chains 31 are trained about the sprockets and suitable threshed material carrying slats 32 are bolted between transversely aligned links of chain 31. The raddle conveyer further includes a bottom pan 34 on which the threshed crop slides as it is conveyed rearward. Suitable provision is made for driving shaft 27 from the engine 8 to move raddle 23 in the direction of arrow A in Fig. 1.

The separating mechanism also includes a straw walker type separating unit or structure indicated generally by reference numeral 36. Referring to Fig. 1 the straw walker unit 36 is operatively mounted rearwardly and somewhat below the discharge end of the raddle conveyer 23. A rotary beater 24 is mounted adjacent the discharge end 93 for the purpose of agitating the threshed material as it passes to the walker unit 36. The means for mounting the straw walker unit 36 includes front and rear multiple throw crankshafts 37 and 38 which are mounted to rotate about axes 40 and 41 which extend transverse of the separator housing 7. It is to be understood that a suitable drive sprocket and chain (not shown) serves to rotate first shaft 37 continuously on its axis in the direction of arrow 39 in Fig. 1. The rear or second crankshaft 38 is in driven relation to shaft 37, the driving connection being accomplished by a thrust transmitting member 42 as will be more fully described hereinbelow.

The front and rear crankshafts 37 and 38 are identical in construction and, as shown in Fig. 2, the crankshaft 38 has three crank journals 44, 45 and 46 which are equally spaced from each other axially of the shaft and also about the axis of rotation. That is, the crank arm presenting each journal is offset 120 degrees from the other two crank arm journals so that the shaft 38 will be in dynamic balance during operation. The journals 44, 45 and 46 are in longitudinal alignment with the journals on front shaft 37, only one of which is shown at 47 in Fig. 3. The crankshafts 37 and 38 mount a straw walker unit 36 which includes three walker sections 48, 49 and 50, each identical in construction. As the mountings for each of the walker sections on the crankshafts are also identical, only one walker section 48 (Fig. 3) and the mounting therefor will be described in detail.

Referring to Figs. 2 and 3 the walker section 48 comprises a sheet metal trough which has a horizontal longitudinally extending bottom wall 51, right and left vertical side walls 52, 53 and diverging connecting walls 56 and 57 which extend between the side walls 52 and 53, respectively, and the bottom wall 51. A front cradle bracket 58 is fixedly secured to the diverging walls 56 and 57 adjacent a forward portion of the walker section 48 as by welding and a rear cradle bracket 59 is similarly secured to the diverging walls 56 and 57 adjacent the rear of the walker section 48. The walker section 48 is also provided with a foraminous straw carrying rack generally indicated by the reference character 61 which extends the full length of the walker section from front to rear and across the full width of the section between the inner surfaces of the side walls 52 and 53. The rack 61 is constructed in the form of a perforated sheet metal stamping of zigzag profile and the openings 62 are provided so that grain and chaff may pass therethrough during the separating action of the straw walker section.

The crank journals 44 and 47 (Fig. 3) are each provided with bearing means in the form of split bearing blocks 64 and 65. Each bearing is secured to its respective journal by means of four bolts 67. The thrust transmitting member or strap 42 is fixedly mounted between the bearing blocks 64 and 65 by means of the same bolts 67 which secure the bearing blocks 64 and 65 to their respective crank journals. The longitudinal distance between the crank journals 44 and 47 must be exactly the same as the longitudinal spacing of the axes 40 and 41 of the crankshafts 37 and 38 for proper synchronization and operation. If this spacing is not accurately maintained the mounting bearings for the crankshafts 37 and 38 and the bearing blocks 64 and 65 will be subject to undue loading and rapid wear. Further, if the crankshafts 37 and 38 are not synchronized the member 42 will be subject to tension and compression forces which will unduly wear the mounting apertures and associated bolts 67. The distance between the crank journals is accurately determined at the time of manufacture by proper spacing of the apertures in member 42. Thus, when the thrust transmitting member 42 is installed the shafts are automatically synchronized.

The member 42, shown best in Fig. 3, has a stepped configuration including a first mounting portion 68, a second mounting portion 69 and a connecting or riser portion 70. The stepped configuration is for the purpose of providing mounting surfaces 68' and 69' on portions 68 and 69 which extend parallel to the mounting surfaces 58' and 59' on the cradle brackets 58 and 59. The mounting portions 68 and 69 of the thrust transmitting member 42 are each provided with pairs of slots 71, 72 and 73, 74, respectively. The cradle brackets 58 and 59 of the walker section 48 are provided with suitable apertures spaced to register with the pairs of slots 71, 72 and 73, 74.

In assembly the walker section 48 is placed in the combine with the cradle brackets 58 and 59 registering on the mounting portions 68 and 69 of the thrust transmitting member 42. The mounting of cradle bracket 59 on the member 42 is shown in detail in Fig. 4. Releasable fastening means in the form of a series of four attaching bolts 76 are operatively interposed in load transmitting relation between the mounting portion 69 and the cradled bracket 59 to rigidly secure the walker section 48 on the rear crankshaft 38. The forward cradle bracket 58 is mounted on member 42 in an identical manner. It will be appreciated by reference to Fig. 3 that the thrust transmitting member 42, brackets 58 and 59, and bolts 76 constitute means for mounting the straw walker structure 36 for adjustment relative to the conveying structure 23 so as to afford a variable passage between the end 96 of the straw walker structure and the discharge end 93 of raddle conveyer 23 as will be more fully explained hereinbelow.

It is to be understood that each of the other straw walker sections 49 and 50 are similarly mounted on the crankshafts to afford longitudinal adjustment in an identical manner.

The separating mechanism 6 (Fig. 1) further includes a precleaning or upper fan 77 which is mounted directly under the raddle conveyer 23 so that the discharge thereof is directed to the passage 78 defined by the discharge end 93 of the raddle 23 and the forward end 96 of the straw walker unit 36. A grain deflecting pan 79 is positioned below the passage 78 between the raddle conveyer 23 and the walker unit 36 in receiving relation to the separated grain and chaff which is discharged from straw walker bottoms 51. The pan 79 serves to direct the material which falls thereon to the cleaning shoe assembly 81 positioned below the straw walker unit 36.

The cleaning shoe assembly 81 includes an upper or chaffer sieve 82 and a lower or shoe sieve 83 which is mounted in underlying relation to the chaffer sieve 82. A second or finish cleaning fan 84 is positioned forwardly of the shoe unit 81 and the air blast from the fan 84 is directed through the sieves 82, 83 to blow out the lighter material such as chaff and fine straw while the grain drops down through the openings in sieves 82 and 83. The finish cleaning shoe 81 includes a conventional tailboard 86 which prevents the air from fan 84 from flowing directly across the sieves rather than through them. A grain pan 87 is positioned to collect the clean grain which passes through sieves 82 and 83. Pan 87 is pitched to convey the grain by gravity action to auger 88 which conveys the clean grain in conventional manner to the grain bin 11. The tailings material such as unthreshed grain which does not pass through the openings in finish cleaning sieve 82 travels to the end thereof where it falls through a grate 89 onto the tailings return pan 91 where it is conveyed by gravity action to the tailings return auger 92. The tailings material is returned to the threshing cylinder 12 by conveying means (not shown) in a conventional manner as is well known in the art.

Fig. 5 is a diagrammatic showing of the separating mechanism with the rotary beater 24 omitted. For purposes of explanation only one walker section 48 will be referred to though it is to be understood that the walker unit 36 includes the three sections 48, 49 and 50 shown in Fig. 2, each of which functions in a manner similar to section 48.

In operation the standing crop is cut by the reciprocating cutter bar and conveyed by the auger 17 and feed mechanism 19 through the threshing cylinder 12. The threshed material generally identified by the reference numeral 97 is then fed onto the raddle conveyer 23 which carries material rearward through the separator housing 7. As the threshed material 97, that is, the mixture of straw, loose kernels, unthreshed heads, fine or shredded material in the form of chaff, leaves and beards, travels rearwardly, the chaff, grain and fine or shredded material tends to sift through the coarse material and moves along the raddle pan 34. As the threshed material 97 reaches the end 93 of the raddle 23 it is discharged onto the straw walker 48.

For some crops it is desirable that all of the threshed material 97 be passed directly to the straw walker to prevent the finish cleaning shoe assembly 81 from being overloaded with straw and chaff. This is accomplished by mounting the straw walker section 48 under the discharge end of the raddle, as shown in Fig. 5. During operation the rotation of crank throw 47 in the direction of arrow 39 will move the walker rearwardly about the arc of the crank throw travel from the position shown in Fig. 5 to the position shown in Fig. 6. When in the forward position of adjustment (Fig. 6), the crank throw travel is not sufficient to move the walker section 48 rearwardly enough to provide a space for vertical passage of separated material between the end 93 of the raddle conveyer 23 and the forward end 96 of the walker section 48.

In operation the walker 48 is driven with an oscillating movement which agitates and moves the threshed material 97 rearwardly. This oscillation is at a high rate and during the rapid downward movement of the walker 48 a space exists between the top of the straw walker rack 61 and the mass of threshed material. A current of air from fan 77 is directed through the passage 78 between the raddle and the walker. This air flows between the material 97 and the straw rack 61 and also between the straw rack 61 and the walker bottom 51 (Fig. 2). The end 94 of the walker is closed so that the air flowing through the open forward end of the walker trough defined by walls 51, 56 and 57 (Fig. 2) will have to pass upward through the openings 62 in the straw rack 61. This flow of air tends to keep the light shaff up above the rack but this air flow is not sufficient to prevent the heavier grain from falling through the openings onto the sloping walker bottom 51. In addition to being exposed to the air from fan 77, material 97 is constantly agitated as it is engaged by the oscillating walker 48. As the grain separates out it is conveyed by gravity action along the bottom 51 to the open forward end 96 of the walker where it drops to pan 79 and then onto the finish cleaning shoe 81.

The forward position of adjustment for the walker sections, as shown in Fig. 5, is suitable for processing crops which when threshed do not contain an objectionably large amount of fine material such as shredded straw, chaff, leaves and beards 98. However, if the mass of material which is discharged from the cylinder does contain a substantial amount of such fine material, the grain will not be properly separated from the mass during its passage over the straw walkers. In that case, fine material will cohere and form a mat extending over a substantial portion of the straw walkers which will not pass downwardly through the openings of the latter. As a result, passage of the grain through the straw walker openings will be seriously impeded. This condition will also frequently be encountered in harvesting down crops because in that case large amounts of rotten straw are apt to be contained in the material which is discharged from the threshing cylinder and which will tend to form a grain impeding mat on the straw walkers.

As mentioned before, the raddle 23 carries the threshed material 97 rearward and during this movement an amount of preliminary separation takes place. Some of the grain and other fine material works down through the straw and other coarse material and collects on the raddle pan or bottom 34. With the walker section set, as shown in Fig. 5, grain and fine material identified by reference numeral 98 will always fall directly on the walker 48. When this grain and fine material 98 falls directly on the walker in bulk the oscillating action may toss it up against the coarser threshed material 97 and some remixing of the grain and fine material 98 with the coarser material 97 may take place. Any remixing of the grain retards its passage through the straw walker openings and is obviously undesirable.

In order to take care of separating difficulties encountered by reason of the mat of material which forms on the straw walkers the walker section 48 may be adjusted rearwardly to the position shown in Fig. 7. The adjustment is accomplished by loosening bolts 76 which secure the brackets 58 and 59 to the thrust transmitting member 42. The slots 71, 72 and 73, 74 (Fig. 3) in the member 42 permit the entire walker section 48 to be slid rearward as desired. When adjusted to the rearward position shown in Fig. 7, rotation of crankshaft 37 in direction of arrow 39 will result in the movement of the walker section 48 from the forward limit position shown in Fig. 7 to the rearward limit position shown in Fig. 8. It will be noted by reference to Fig. 8 that a horizontal material delivery passage of substantial extent exists between the discharge end 93 of the raddle 23 and the forward end 96 of the straw walker section 48. This passage permits the fine material which has separated out from the threshed material while on the raddle to fall directly to pan 79 and hence to the finish cleaning shoe assembly 81. By passing the fine mat forming material 98 directly to the cleaning shoe assembly 81 the volume of material 97 on the walker is reduced. Due to the absence of a grain impeding mat on the walker sections any residual grain contained in the material passing over the walker sections will be recovered substantially without loss.

In addition to providing a passage for direct feed of fine material to the finish cleaning shoe the rearward adjustment also increases the area between the end 93 of raddle 23 and the forward end 96 of walker 48. Such increase in area decreases the velocity of the air passing through that area. As a result the flow of air from fan 77 will have no objectionable effect on the passage of fine material from the raddle past the forward end 96 of the walker 48 to the pan 79.

As discussed above each of the three walker sections 48, 49 and 50 is mounted to permit adjustment. Thus, the size of the material delivery passage 78 may be varied by adjusting one, two or all three of the straw walkers. For example, if it is desired to concentrate the air flow on the center of the separating area only the center walker 49 (Fig. 2) will be moved rearwardly.

As previously discussed a thrust transmitting member 42 is fixedly connected between each pair of crank throws to synchronize the crankshafts 37 and 38. As the walker sections 48, 49 and 50 are mounted on their respective thrust transmitting members 42 and not directly between the crankshafts, the adjustment of one, two or all three of the walker sections is accomplished without affecting the synchronization of the crankshafts.

In combining corn it is sometimes desirable to remove the walker sections entirely. In conventional constructions when the walker sections are removed the trash tends to hairpin or wrap around the crankshafts. With the construction described hereinabove when the walker sections 48, 49 and 50 are removed the flat thrust transmitting members 42 remain in the machine and they will continue to be driven in an oscillating manner. The members 42 prevent the wrapping or hairpinning of material about the crankshafts 37 and 38 and in addition their walking action facilitates the separating action and aids in moving the trash through the separator housing.

It should be understood that it is not intended to limit the invention to the herein disclosed forms and details of construction and that the invention includes such other forms and modifications as are embraced by the scope of the appended claims.

What is claimed is:

1. In a combine harvester of the type having a threshing cylinder, a raddle conveyer in threshed crop receiving relation to said threshing cylinder, a straw walker separating structure operatively mounted in threshed material receiving relation to said raddle conveyer, and a cleaning unit operable to finish clean separated threshed material delivered thereto from said raddle conveyer and straw walker separating structure, the improvement comprising releasable fastening means operatively mounting said straw walker structure on said combine harvester for adjustment relative to said raddle conveyer so as to afford a variable passage therebetween for delivery of separated threshed material to said cleaning unit.

2. In a combine harvester of the type having a threshing cylinder, a raddle conveyer in threshed crop receiving relation to said threshing cylinder, a straw walker separating structure operatively mounted in threshed material receiving relation to said raddle conveyer and a cleaning unit operable to finish clean separated threshed material delivered thereto from said raddle conveyer and straw walker separating structure; the improvement comprising means operatively mounting said straw walker separating structure on said combine harvester for adjustment relative to said raddle conveyer, said means including first and second shafts each having a crank arm, bearing means mounted on each of said crank arms, a thrust transmitting structure connected between said bearing means, at least one of said structures having mounting slots therein, and releasable fastening means cooperable with said slots and operatively interposed in load transmitting relation between said thrust transmitting structure and said straw walker separating structure to secure the latter in selected positions of adjustment.

3. In a combine harvester of the type having a threshing cylinder, a raddle conveyer in threshed crop receiving relation to said threshing cylinder, a straw walker separating structure operatively mounted in passage forming threshed material receiving relation to said raddle conveyer, a cleaning unit operable to finish clean separated threshed material delivered thereto from said raddle conveyer and straw walker separating structure, and means for creating a flow of air through said passage between said raddle conveyer and straw walker structure; the improvement comprising means mounting said straw walker unit on said combine harvester for adjustment relative to said raddle conveyer so as to afford a variable passage therebetween for controlling the flow of air therethrough and the delivery of separated threshed material to said cleaning unit.

4. In a combine harvester of the type having a threshing cylinder, a raddle conveyer in threshed crop receiving relation to said threshing cylinder, a straw walker separating structure including a plurality of sections operatively mounted in passage forming threshed material receiving relation to said raddle conveyer, a cleaning unit operable to finish clean separated threshed material delivered thereto from said raddle conveyer and straw walker separating structure, and a cleaning fan for directing a flow of air through said passage; the improvement comprising means mounting each of said straw walker sections on said combine harvester for adjustment relative to said raddle conveyer, said means including first and second shafts mounted on said combine harvester and each having a crank arm thereon, bearing means mounted on each of said crank arms, a thrust transmitting structure connected between said bearing means, and releasable fastening means operatively interposed in load transmitting relation between said thrust transmitting structure and said straw walker section to secure the latter in selected positions of adjustment.

5. In a combine harvester of the type having a threshing cylinder and a conveying structure in threshed crop receiving relation to said threshing cylinder, the combination of a separating structure; means operatively mounting said separating structure so as to present a material receiving end portion thereof in spaced underlying relation to a material delivering end portion of said conveying structure, and a cleaning unit operatively mounted in underlying material receiving relation to said material delivering end portion of said conveying structure and in separated material receiving relation to said separating structure; at least one of said structures being mounted on said combine harvester for adjustment relative to the other so as to afford a variable passage between said material delivering end portion of said conveying structure and said material receiving end portion of said separating structure through which separated threshed material may pass from said conveying structure to said cleaning unit.

References Cited in the file of this patent

UNITED STATES PATENTS

| | | |
|---|---|---|
| 751,417 | Reeve | Feb. 2, 1902 |
| 739,349 | Russell | Sept. 22, 1903 |
| 2,814,300 | Oberholtz | Nov. 26, 1957 |

FOREIGN PATENTS

| | | |
|---|---|---|
| 116,579 | Australia | Feb. 12, 1943 |